April 24, 1934.   E. C. MOGFORD ET AL   1,955,824
REAR AXLE HOUSING
Filed June 16, 1930   4 Sheets-Sheet 1
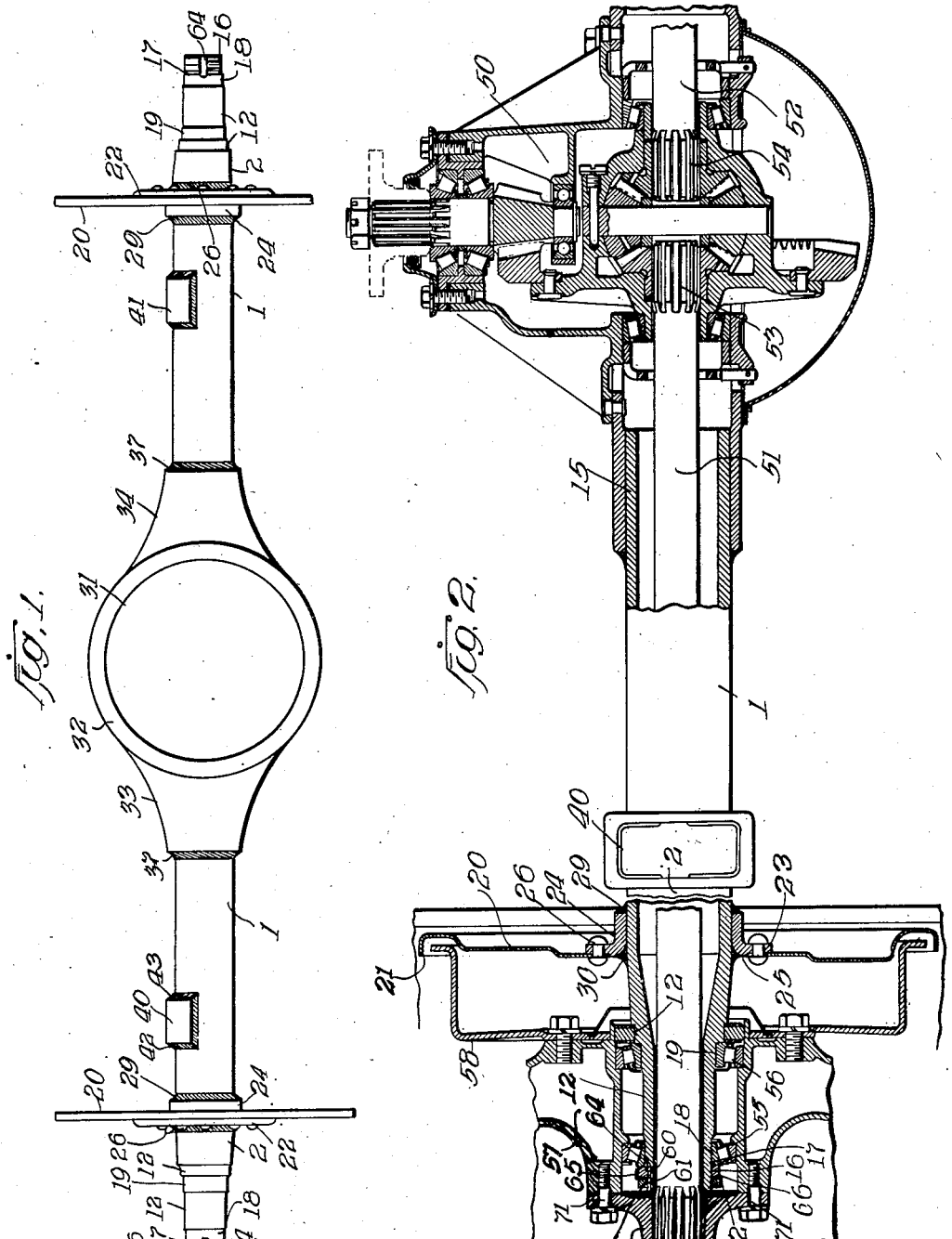

April 24, 1934.   E. C. MOGFORD ET AL   1,955,824
REAR AXLE HOUSING
Filed June 16, 1930   4 Sheets-Sheet 2
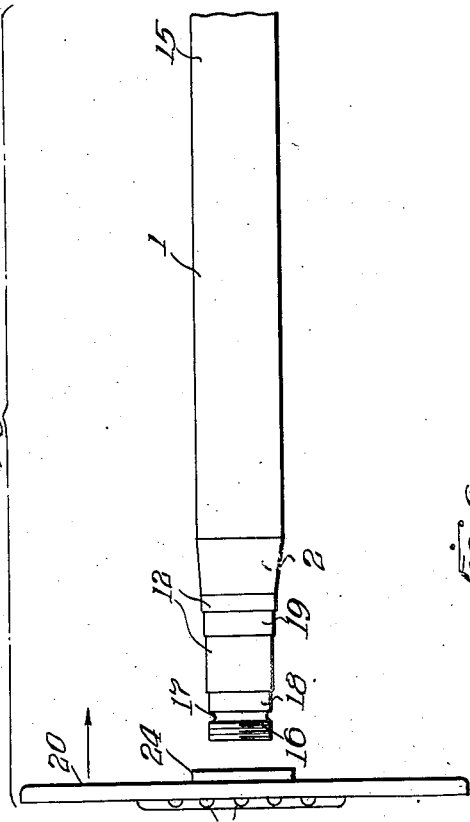
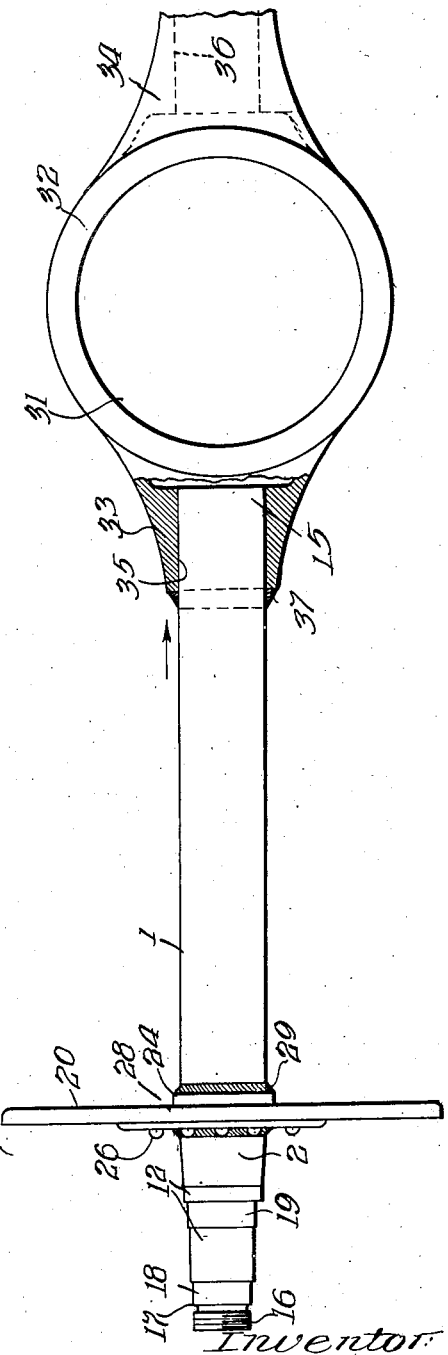
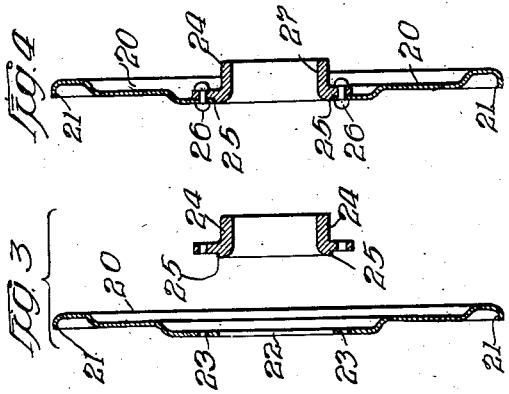
Witnesses:
Harry P. L. White
Robert Cremer
Inventor:
Edward C. Mogford
George Spatta
By Brown Jackson Bottcher
Cremer
Attys

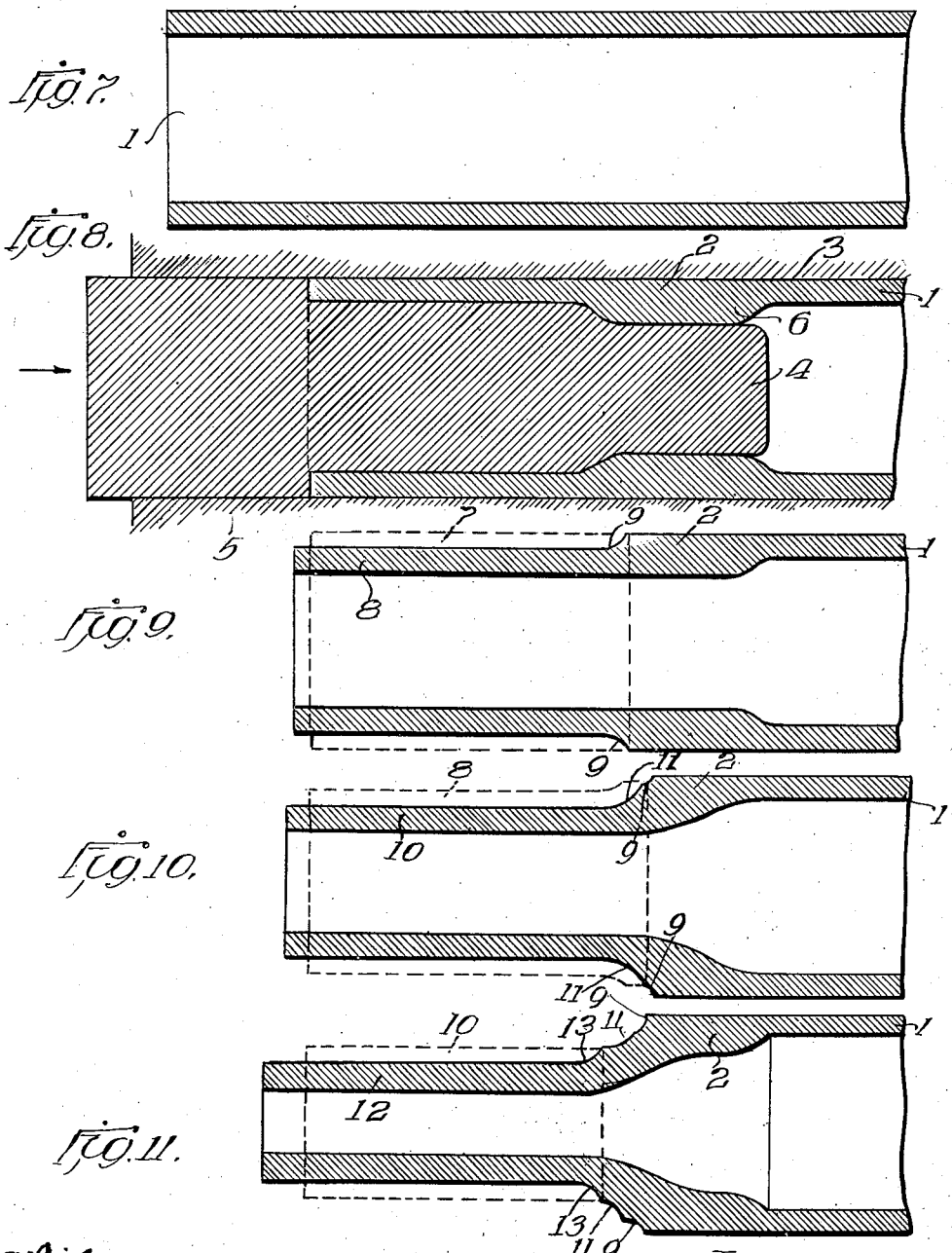

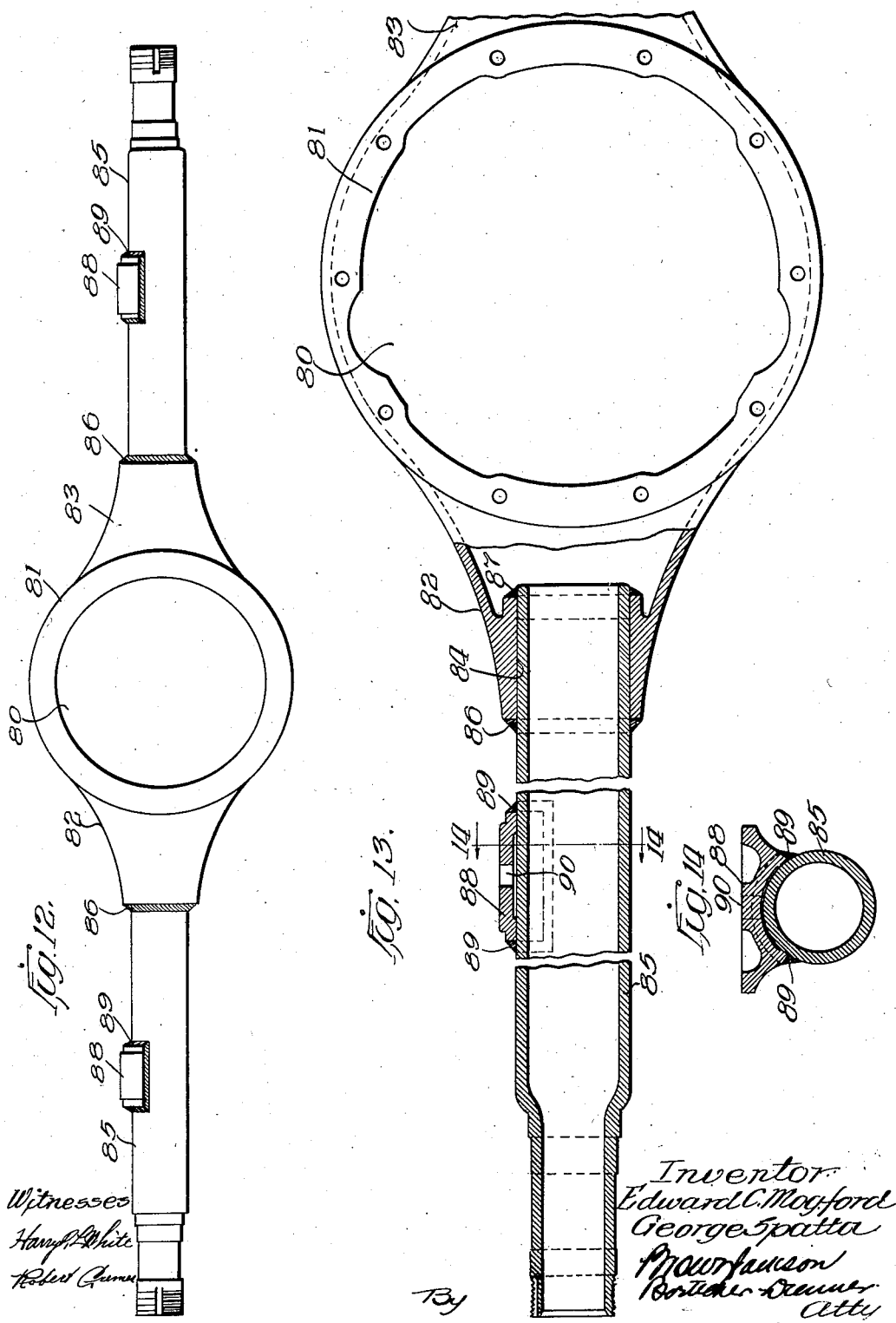

Patented Apr. 24, 1934

1,955,824

UNITED STATES PATENT OFFICE 1,955,824

REAR AXLE HOUSING

Edmund C. Mogford and George Spatta, Buchanan, Mich., assignors to Clark Equipment Company, Buchanan, Mich., a corporation of Michigan Application June 16, 1930, Serial No. 461,392

2 Claims. (Cl. 74—56)

Our invention relates to rear axle housing and method of making the same.

In our present invention, we disclose a heavy duty rear axle housing and a method of making the same. The housing of the instant disclosure is suitable for heavy trucks, motor busses, and the like.

In busses, motor trucks and the like, it is customary to provide a full floating rear axle in which the weight of the vehicle is carried from the wheel through bearings directly to the axle housing, and the driving spindles are extended through this housing from the differential to the wheels. Axle housings of this type are old in the art. Such housings have generally been made of a casting, with the result that the housing is unduly heavy.

According to the present invention, we make up a separate differential housing often termed a banjo frame, which is designed to receive the differential gear. This differential housing or banjo frame is made as a separate member, preferably by casting, although any equivalent means for making up a suitable part of this character may be employed. This banjo frame is provided of the proper configuration and wall thickness to serve its function as a support for the differential gear and connected parts, and is provided at opposite sides with two hollow bosses which form sockets for receiving axle arms. The axle arms are manufactured separately and then joined to the axle housing or banjo frame, preferably by a press fit. This method of manufacturing separately the axle arms and the central banjo housing or frame is highly advantageous for a number of reasons, first of which is the ease and uniformity of manufacture. It is more difficult to make a complete axle housing from end to end of a single casting. It is difficult and expensive to make a large thin walled casting. More expensive equipment is required, and cast iron is not particularly suitable for the stresses to which the arms are subjected. It is easier to handle a small casting and to manufacture the arms separately than to produce and machine the entire axle housing in one piece. The stress and vibration to which the housing is subject is a maximum at the ends, since the wheels and the springs there support the load of the vehicle, and cast metal at this point is not well adapted for the service required. The ends of the arms are forged to reduce their diameter and to increase the wall thickness at the critical points where the stresses are greatest. This composite axle is therefore highly advantageous both for its ease and certainty of manufacture and for the resulting structural advantages which it possesses in use.

The method of producing the axle herein disclosed is more fully covered in our copending application Serial No. 551,879, filed July 20, 1931, which is a division of the instant application and to which reference is here made for those details.

The axle arm consists of a hollow tubular member of suitable length and having suitable wall thickness, in one embodiment of our invention this member consists of a steel tubing approximately 3½" in diameter and having a wall thickness of ⅜ of an inch.

In manufacturing the axle arm from a tubular blank of these dimensions, the blank is first heated, and then upset by endwise forging to thicken its walls at a point adjacent one of its ends. The blank is then shrunk by forging operations, forming an end section of reduced diameter, which section extends to the thickened wall section of the blank.

The cylindrical end section of smaller diameter is then machined to afford seating surfaces for the bearings that are to support the wheels on it, and the outside surfaces of the blank are machined accurately to a size which will form a perfect fit with the inside surfaces of the sockets on the differential housing for pressing the two parts together. A brake shoe plate is formed with a flanged collar having an opening centrally located in it, which plate is mounted on the housing member with that member projecting through the opening. This plate is preferably placed on the housing member by a hydraulic pressing operation, and is subsequently attached thereto in any preferred manner such as by riveting or welding.

After these operations have been completed, the arm member is pressed into the socket of the differential housing, and suitably attached therein in any preferred manner, such as by ring welding, riveting, or spot welding, to securely lock the two housing members together.

A similar axle arm is formed and similarly brought into registration with and fastened in the other socket on the differential housing to complete the rear axle housing assembly.

Suitable spring pads are attached to the axle housing between the brake shoe plate and the differential housing, these pads being preferably metal forgings welded to the housing, although if desired cast metal pads or pressed steel pads may be substituted within the teachings of our invention.

The axle housing constructed in accordance with the foregoing method is lighter for a given strength than the cast metal housings that have been constructed heretofore. It is symmetrical and of pleasing appearance, and can be fabricated at a low cost.

Now to acquaint those skilled in the art with the teachings of our invention, reference is here made to the accompanying drawings in which a preferred embodiment of it is shown by way of example, and in which:

Figure 1 is an elevational view of a completely assembled axle housing;

Figure 2 is a plan view, partly in section, of the axle housing with the axle and differential in place in it;

Figure 3 is a cross-sectional view through the brake shoe drum and flange;

Figure 4 is a similar view of the brake shoe plate and flange assembled;

Figure 5 is an exploded view of the axle housing and brake shoe plate prior to assembly;

Figure 6 is an assembly view partly in section of the axle housing and differential housing;

Figure 7 is a cross-sectional view through the tubular blank from which the axle housing is made;

Figure 8 is a similar view taken at the end of the first step in the process of manufacture of the housing;

Figure 9 is a cross-sectional view showing the first swedging operation performed on the blank;

Figure 10 is a similar view showing the second swedging operation performed on the blank;

Figure 11 is a similar view showing the third and last swedging operation performed on the blank;

Figure 12 is an elevational view of a slightly different type of axle;

Figure 13 is a cross-sectional view of the axle housing shown in Figure 12 showing the details of its construction;

Figure 14 is a cross-sectional view taken along the line 14—14 of Figure 13 showing the details of the spring seat.

Referring now to the drawings in more detail, particularly Figures 7 to 11 inclusive, the tubular axle arm is formed from a blank 1 which is of proper diameter, and length, and which has the proper wall thickness, these dimensions all being optional and varying with the particular type of axle being fabricated. In one embodiment of our invention, the blank 1 is approximately 4½" in diameter, and has a wall thickness of ⅜ of an inch.

The blank is heated, locally at 2, in any preferred manner and upset by endwise forging to thicken its walls in the heated region. During this endwise upsetting operation, the exterior surface of the blank 1 is gripped in a suitable clamp 3 and a punch or plunger 4 is placed within the blank to shape the inside surfaces of it and to hold the axis of the blank in alignment. The metal moved from the end section 5 of the blank by this operation is gathered in the form of an internal ring or collar 6 which is shaped by the plunger 4, the external diameter of the blank 1 being maintained constant by the external clamp or die 3. This operation of course shortens the length of the blank somewhat.

After the walls have been thus thickened, the blank is allowed to cool, and then swedged by forcing an external collar over its end section 7, moving the metal in that section inward to form a cylinder 8 which has a diameter somewhat smaller than the external diameter of the blank 1.

Any preferred form of swedging machine may be used for this operation, and preferably a suitable punch is inserted in the inside of the tube to maintain the cylindrical section 8 in alignment with the cylindrical section 1. This swedging operation of course lengthens the tube somewhat, and forms a shoulder 9 located adjacent the section 2 the walls of which have previously been thickened.

Upon the completion of the first step in the swedging operation shown in Figure 9, a second and similar step is performed, moving the metal from the cylinder 8 inward to form a new cylinder 10 of smaller diameter and slightly greater length, this operation forming a new shoulder 11 spaced inwardly of the former shoulder 9, that is the shoulder 11 is moved toward the center of the thick wall section 2.

A third and last swedging operation is next performed, which operation moves the metal from the cylinder 10 inwardly to form a new cylinder 12 of smaller diameter and greater length, the operation forming a shoulder 13 located outwardly from the thick wall region 2 further than the shoulder 11.

Since the external surfaces of the blank must be machined to form seats for the bearings of the wheel and for the grease retaining devices, no effort is made during the swedging operation to form a smooth shoulder at the junction of the thick wall section 2 and the end cylinder 12 of the blank, and the shoulders 9, 11 and 13 are somewhat visible in the completed blank.

Preferably the swedging operations are all made with the blank cold, and by a hydraulic swedging machine, although if desired hot swedging process may be substituted within the teachings of our invention. As shown, the swedging of the blank to form the small diameter end cylinder 12 is performed in three steps, and obviously a larger or smaller number of steps may be employed to form the cylinder if desired.

The swedging operations tend to thicken the walls of the cylinder 12, this thickening of the walls supplying excess metal which is removed in the machining operation, with the result that the wall thickness of the end cylinder 12 in the finished housing is substantially the same as the wall thickness of the main part of the blank 1. Obviously by suitable design of the punch and swedging dies employed to form this cylinder 12 the walls of it can be thickened more or less as desired.

After the last swedging operation has been performed, the blank is next machined in a suitable lathe which finishes the external surface of the main portion 1 of the blank into a perfect cylinder of a particular diameter, this diameter being held within close limits particularly at its end 15 which is to be subsequently joined with a differential housing. The end cylinder 12 is machined smooth and a threaded portion 16, oil groove 17, bearing race seat 18, bearing race seat 19, and oil retainer seat 12 are formed in it, all of these being held to rather close limits in accordance with established practice. The cylindrical portion 12, which is of smaller diameter than the main portion 1 of the blank and maintained with its axis in alignment, is joined to the larger portion 1 by a frusto conical section 2 the external surface of which is machined to an accurate taper.

In the manufacture of the preferred embodiment of our invention, the next step in the process consists of forming a brake shoe plate or disc 20 which is preferably a sheet metal stamping provided with a peripheral flange 21 and with a central opening 22, which opening is circular and around which a plurality of rivet holes 23 are formed. A flange collar 24 is cast or forged and a shoulder 25 machined in it, which shoulder registers accurately with the opening 22 in the brake shoe plate 20. The plate and flange are assembled and attached together in any preferred manner such as by rivets 26 although if desired these units may be welded or otherwise suitably attached.

The internal opening 27 of the flanged collar 24 is machined accurately to size so that it will fit over the large portion 1 of the axle housing, this fit preferably being a press fit. The brake shoe plate is pressed onto the axle housing 1 and accurately positioned thereon at 28, where it is rigidly attached to the housing in any preferred manner such as by the ring welds 29 and 30. If desired, the flange 24 may be riveted to the housing 1 or may be spot welded thereto within the teachings of our invention.

As will be seen in Figures 1 and 6, the differential housing 31 consists of a circular banjo 32 having cylindrical bosses 33 and 34 formed integral with it and disposed on diametrically opposite sides of it. This housing may be either a cast iron housing, or if desired it may be formed from pressed metal, being formed in two sections which sections are attached together in any preferred manner such as by riveting or welding.

The interior surfaces 35 and 36 of the bosses 33 and 34 respectively are machined accurately to size to form a press fit with the accurately machined section 15 of the axle housing 1, and in the next step of the manufacture of the preferred embodiment of our invention, the axle arm 1 is suitably gripped in one of the elements of a suitable hydraulic press and the differential housing 31 gripped in the other jaw of that press and the two pressed together.

As will be apparent to those skilled in the art, by suitable design of the socket members which unite the axle arm 1 and the differential housing 31, these members can be joined with their axes accurately aligned with each other, so that in the completed unit, the axle arms 1 project on a diameter from the cylindrical section 32 of the differential arm 1.

If desired, an axle arm member 1 may be inserted in the socket in the boss 34 simultaneously with the insertion of a similar member in the socket in the boss 33, or if desired, these two units may be inserted separately within the teachings of our invention.

After the arm member 1 has been pressed into the boss 33, it is fastened in there in any preferred manner, such as by the ring weld 37 or by rivets projecting through the walls of the boss 33 and the walls of the end 15 of the tubular member 1. In certain instances, it may be advantageous to secure the axle housing in the differential housing by means of a spot weld formed by drilling through the walls of the bushing 33 and housing 1 and then filling the drill hole with metal by welding. Regardless of the type of fastening employed to join these two units together, they must be securely fastened so that the axle arm 1 cannot rotate or move longitudinally with respect to the differential housing.

After the arm member 1 has been welded into the differential member, spring pads 40 and 41 are attached to the arm member in any preferred manner such as by welding. The spring pads may be pressed metal pads, forged metal pads, or if desired may be sheet metal punchings and are preferably attached to the arm member 1 by ring welds 42 and 43 located on opposite sides of the seat members.

The axle thus completed, is cleaned and painted in the usual manner, and is in readiness to receive the drive shaft and differential unit indicated generally at 50, Figure 2. The particular type of differential mechanism employed in this housing is not of the essence of the present invention. Drive shafts 51 and 52 are placed in the housing member 1 and connected to the differential mechanism by splined connections 53 and 54, these axles each projecting outward from the differential through the axle arm and beyond the free end of it. Roller bearings 55 and 56 are placed on the bearing seats 18 and 19 respectively to mount the wheel 57 on the end of the axle housing, this wheel bearing a brake drum 58 which registers with the brake shoe plate 20 in the obvious manner. The bearings 55 and 56 are held in place by nuts 60 and 61 which are threaded onto the thread 16 in the end of the housing with the lock washer 62 interposed between them. This washer contains an ear 63 projecting into the key way 64 in the threaded portion of the housing, which ear prevents rotation of the lock washer. Ears 65 and 66 of this washer are projected over nuts 60 and 61 respectively to prevent them from loosening and thus releasing the bearings 55 and 56 from the axle arm.

Any suitable type of wheel may be mounted on the axle arm in this manner, the wheel partially shown in the drawings being of the dual wheel type and comprises a cast iron spider which carries two pneumatic tires the rims of which are attached directly to the ends of the spokes of the spider.

The driving axle 51 is connected to the wheel spider by a plate 70 splined to the outer ends of the axle and attached to the wheel by bolts 71 which project through the plate and into the hub section of the spider.

The order of performance of the various steps in the fabrication of the preferred embodiment of our invention as enumerated hereinbefore, can be varied within the teachings of our invention. Preferably the axle arm 1 is machined immediately after it has been formed and before it is pressed into the collar of the differential housing, and preferably the brake shoe plate 20 is attached to the arm 1 prior to its insertion in the differential housing. This preferred form of procedure eliminates the necessity of centering the axle arm a plurality of times since when it is centered all of the machining that is to be done on it is accomplished. Furthermore by machining the axle arm member 1 before it is attached to the differential housing member 31, the necessity of swinging the differential arm as well as the axle housing is eliminated.

In certain instances, however, it may be advantageous to attach the axle arm to the differential housing before the former has been machined, and such procedure is contemplated within the teachings of our invention. By assembling the differential housing and axle arm prior to the machining of the latter, the axle arm can be gripped at its end and pressure exerted against it and during the operation of pressing it into the socket 33 of the differential housing, whereas if the axle arm is machined prior to such operation, other arrangements must be provided for gripping the axle arm since its end is threaded and cannot be subjected to great pressure without damaging the threads.

In Figures 12, 13 and 14, we have shown a modified form of housing made in substantially the same manner as hereinbefore pointed out. It will be noted that the diffential 80 is provided with the flanged circular portion 81 from opposite sides of which are projected the cylindrical bosses 82 and 83, each machined at 84 to receive the end of the axle arm 85. The boss 82 projects outward slightly further than the boss 33 of the prior discussed embodiment of our invention, and the axle arm 85 is pressed into this boss slightly farther than in the preferred embodiment. This permits us to weld the axle arm to the differential housing at two points by ring welds 86 and 87, thereby producing a stronger joint between the two members without the necessity of resorting to rivets or spot welds. If desired, rivets or spot welds may of course be used with this embodiment of our invention.

The axle arm 85 is provided with a forged spring seat 88 which is attached thereto by welding at 89 the seat being provided with a central opening 90 into which the bolt of the spring assembly is projected, the head of that bolt serving as a pin for preventing movement of the spring with respect to its seat.

The axle arms 1 and 85 are shown with spring pads attached at points which have the same wall thickness as the remainder of the arm. Ordinarily this is preferable with the thick walled arm that we use, however if desired the walls of the arms under the spring pads can be thickened. This thickening operation will, of course, be performed prior to the forming of the collar 6, Figure 8. This thickened wall provides extra metal and strength to counteract any weakening of the arm occasioned by welding the spring pads thereto.

The outer end of the arm 85 is shaped in the same manner as the arm 1, and if desired a brake shoe plate similar to the plate 20 may be attached to the arm as before.

Although the teachings of our instant invention primarily relate to axle housings of the full floating type, obviously the principles of the invention can be applied to housings of the semi-floating type such as are disclosed in the above mentioned copending application, and we are not therefore to be limited to the specific details shown herein by way of example only. By the employment of suitable forging machines, a flange may be formed in the free end of the axle housing member 1 in lieu of the cylinder 12, to thereby form the member into a housing of the semi-floating type.

The axle herein disclosed readily lends itself to the use of end cylinders such as 1 formed from a piece of flat stock and closed by a longitudinal weld. It will be observed that the greater part of the arm member 1 is not altered during the formation of the completed member from the tubular blank, and it will further be observed that the member is reinforced by circular welds 37 and 29 by which it is attached to the differential unit and by which the brake shoe plate is attached to it. These welds reinforce the member and because of this, fabricated tubular stock made in the manner outlined in our above mentioned copending divisional application may successfully be used in lieu of the seamless tubing hereinbefore described.

Having thus described our invention, what we consider new and desire to have protected by Letters Patent is pointed out in the appended claims.

What is claimed is:

1. A rear axle housing, comprising a substantially circular banjo frame casting having relatively short tubular sockets projecting from opposite sides thereof, axle arms consisting of wrought metal tubes tightly fitting in said tubular sockets, the outer ends of the tubes having reduced bearing portions with thickened walls for supporting wheel bearings, each of said tubes being integral from end to end.

2. A rear axle housing, comprising a substantially circular banjo frame casting having relatively short tubular sockets projecting from opposite sides thereof, axle arms consisting of wrought metal tubes having their inner ends tightly fitting in said tubular sockets, the outer ends of the tubes having reduced bearing portions with thickened walls for supporting wheel bearings, each of said tubes being integral from end to end, and a brake plate for each tube, each brake plate comprising a collar mounted on the tube adjacent the reduced portion, and being joined to the tube by circumferential fusion welding.

EDMUND C. MOGFORD.
GEORGE SPATTA.